United States Patent [19]
Cowan et al.

[11] Patent Number: 5,549,200
[45] Date of Patent: Aug. 27, 1996

[54] SWAB DISPENSER

[75] Inventors: Kevin Cowan, Clinton; John Eimer, Danbury; James Turbett, Stanford, all of Conn.

[73] Assignee: Chesebrough-Pond's USA Co., Division of Conopco, Inc., Greenwich, Conn.

[21] Appl. No.: 470,514

[22] Filed: Jun. 6, 1995

[51] Int. Cl.⁶ .................................................. B65D 85/08
[52] U.S. Cl. ........................... 206/362; 220/410; 220/555
[58] Field of Search ........................... 206/229, 361–366, 206/362.1–362.4, 370, 570, 45.34, 459.5; 220/408, 410, 553, 555, 608, 609

[56] References Cited

U.S. PATENT DOCUMENTS

| | | |
|---|---|---|
| 3,261,501 | 7/1966 | Capucio . |
| 4,250,998 | 2/1981 | Taylor ..................................... 207/570 |
| 4,687,129 | 8/1987 | Cugley ................................. 206/45.34 |
| 4,989,730 | 2/1991 | Lemoine . |
| 5,007,535 | 4/1991 | Meseke et al. ......................... 206/363 |
| 5,131,536 | 7/1992 | Wu ......................................... 206/362 |
| 5,147,035 | 9/1992 | Hartman . |

Primary Examiner—Jimmy G. Foster
Attorney, Agent, or Firm—Milton L. Honig

[57] ABSTRACT

A swab dispenser system is provided that includes a reusable outer receptacle and a replaceable refill container insertable therewithin. The outer receptacle is formed with a fin projecting vertically upwardly and centrally positioned on the bottom panel of the receptacle. The fin has a horizontal length greater than a width thereof. The refill container on its bottom wall also includes a fin. The fin of the refill container has a hollow interior for form-fittingly receiving the fin projecting upwardly from the receptacle bottom panel. Function of the fin is to allow a consumer to properly orient the refill container when placing same into the receptacle. The fin also functions to direct swabs into a proper arrangement when they are being factory filled into the container. Furthermore, the position and geometry of the fin maximizes the number of swabs fillable into the container.

22 Claims, 3 Drawing Sheets

5,549,200

SWAB DISPENSER

BACKGROUND OF THE INVENTION

1. Field of the Invention

The invention relates to a dispenser including an outer receptacle receiving a replaceable refill container for elongated rod shaped articles, especially for cotton-tipped swabs.

2. The Related Art

Merchandising of certain rod shaped articles, such as cotton-tipped swabs, requires a dispenser for holding a group of these articles in oriented fashion. Single articles must be dispensable from a predetermined dispensing position while a second of the articles of the group is automatically brought into the vacated position. When the article is a cotton-tipped swab, it is important that the article be kept clean. The dispenser must minimize the risk of contamination from dust and dirt. Particularly important is that the dispensing of the product be facile while at the same time minimizing exposure of the remaining swabs to contaminates.

A variety of packaging systems for these purposes have been described in the literature. U.S. Pat. No. 5,147,035 (Hartman) discloses a thermoformed blister of flexible plastic material sealed to a backing card. The package includes a cover and an egress opening. A hinge is provided for the cover which rotatably attaches to the thermoformed blister.

U.S. Pat. No. 3,261,501 (Capucio) discloses a dispenser for rod-shaped articles such as cotton-tipped swabs. The package is designed so that dispensing may be effected without contacting the ends of the articles. When it is desired to dispense the product, passage through a normally closed opening is achieved by using the thumb to engage the article's center portion via a cut-out section.

U.S. Pat. No. 4,989,730 (Lemoine) reports a cotton swab shipping container and dispenser. A removable "T" shaped panel is provided for converting from a shipping container to a dispenser function.

While present commercial packages and those described in the above literature are quite serviceable, there is a need for sturdier dispensers especially for commercial usage. Strengthening of packaging for the swab normally accompanies the unfortunately negative effects of increased cost and waste disposal.

A partial solution to these problems would be use of an outer, relatively costly receptacle intended for reuse in combination with a relatively inexpensive refill container. Implementation of this concept is hindered by several further difficulties. For instance, a mechanism is necessary for achieving proper orientation of the refill container within the outer receptacle. A mechanism is also necessary to restrict movement of the refill within its receptacle to protect the former during shipping. These mechanisms must be relatively unobtrusive so as to avoid dead space within the refill thereby maximizing the number of swabs within the package. Interference also must be minimized between the dispenser and the cotton-tips of the swab which flair outward at ends of the stick.

Accordingly, it is an object of the present invention to provide a swab dispenser with a relatively sturdy outer non-disposable receptacle and an inner replaceable refill container for cotton-tipped swabs.

Another object of the present invention is to provide a swab dispenser with a relatively sturdy outer non-disposable receptacle and an inner replaceable refill container for cotton-tipped swabs wherein the refill container can be properly oriented.

Still another object of the present invention is to provide a swab dispenser with a relatively sturdy outer non-disposable receptacle and an inner replaceable refill container for cotton-tipped swabs wherein movement of the refill container within the receptacle is restricted by a wiggle preventing mechanism.

Yet a further object of the present invention is to provide a swab dispenser with a relatively sturdy outer non-disposable receptacle and an inner replaceable refill container for cotton-tipped swabs wherein a mechanism for preventing wiggle and properly orienting the refill container occupies only a de minimus sized space so the maximum swab count can be packaged therewithin.

These and other objects of the present invention will become more evident through the following drawing and detailed description.

SUMMARY OF THE INVENTION

A swab dispenser is provided whose structure is as follows:

an outer receptacle with an open and a closed end, including:
  a pair of side panels parallel to one another;
  a pair of front panels, the side and front panels each defined by a pair of spaced apart parallel vertical edges and spaced apart upper and lower horizontal edges orthogonal to the vertical edges, the side panels being orthogonally connected to the front panels along the respective vertical edges;
  a bottom panel orthogonally connected to each of the lower horizontal edges defining the closed end of the receptacle, the bottom panel having an inner and an outer surface on opposite faces, the inner surface including a centrally positioned fin projecting vertically upwardly toward the receptacle open end, the fin having a horizontal length greater than a width thereof; and
  a lid attached in a movable manner to an upper area of the receptacle having dimensions sufficient to cover the open end thereof;

a replaceable refill container insertable within the outer receptacle, the container having an open and a closed end, comprising:
  a pair of side walls parallel to one another;
  a pair of front walls, the side and front walls each defined by a pair of spaced apart parallel vertical edges and spaced apart upper and lower horizontal edges orthogonal to the vertical edges, the side walls being orthogonally connected to the front walls along the respective vertical edges;
  a lip formed all along the upper horizontal edge defining the open end of the container; and
  a bottom wall orthogonally connected to each of the lower horizontal edges defining the closed end of the container, the bottom wall having an inner and an outer surface on opposite faces, the inner surface of the container including a centrally positioned fin projecting vertically upwardly toward the container open end, and the container fin on its outer surface having an aperture therewithin for receiving the receptacle fin in a mating relationship.

Preferably the fin of the refill container is wedge shaped with a width that tapers upwardly toward the open end of the container. To minimize loss of space within the refill container, the container fin preferably should have a size no larger than that which would in volume be occupied by from 1 to at most 8 swabs, more preferably at most 4 swabs and optimally at most 3 swabs.

The refill container may be constructed as a thermoformed plastic. Visibility will be aided where the refill container is formed of walls that are of a transparent plastic.

The refill container can have any polygonal shape, but preferably has cubic dimensions, each of the side walls having identical dimensions of width and length.

Ordinarily a product label is provided with the refill container. The label may be accommodated within the refill container behind the front walls which can form an outwardly protruding section to receive same. The outwardly protruding section can have a length equivalent to a full length of the refill container front wall.

Each of the receptacle panels may have a thickness greater than each of the refill container walls. Thereby, the panels of the receptacle are less deformable than the walls of the refill container. The additional rigidity of receptacle panels ensures a sturdy protection around the refill container and because of the former's weight insures against a tip-over of the refill container causing swabs to spill out.

The refill container may further include a top wall covering the open end thereof. The top wall may have an outer perimeter which is releasably sealed to the refill container lip. Advantageously, the top wall is removably peelable from the lip to allow access to swabs being stored in the interior of the refill container. In an alternative embodiment, the top wall may simply have perforations along a portion thereof. For instance, the perforations may trace a path along three sides of the top wall, the fourth unperforated side serving as a hinge line. Access to the swabs is here achieved by breakage of the perforations.

The receptacle along inner surfaces of its panels near the open ends may include a shoulder for supporting the refill container. The lid of the refill container along a lower surface thereof can rest on the receptacle ledge. For ease of use, the lid may be pivotally connected to an upper horizontal edge of the receptacle.

BRIEF DESCRIPTION OF THE DRAWING

The aforementioned aspects of the present invention will become more apparent from the following detailed description taken in conjunction with the accompanying drawing showing a preferred embodiment wherein.

DETAILED DESCRIPTION OF THE INVENTION

Now it has been discovered that a fin fashioned to project upwardly from the floor of a sturdy storage receptacle and a congruent fin in the floor of a replaceable refill container can achieve the various objectives of the present invention. The fins allow proper orientation of the refill container within the storage receptacle. They also prevent movement of the refill receptacle during shipment thus protecting the packaging and contents. Finally, the positioning of the fin in the bottom of the refill container assists in directing the arrangement of cotton-tipped swabs during factory filling of that container.

Shape and positioning of the fin are constructed in consideration of the spacial requirements for stacked swabs. A swab is dumbbell shaped having a relatively thin elongate stick with relatively wide, rounded ends. For most efficient storage, any positioning structure intruding into the inner space of the container must minimize disruption of the stacked swabs. This has been accomplished through an elongate laterally flattened fin, with a height preferably no higher than 8, more preferably no higher than 4, optimally about 3 stacked swabs. Dead space is minimized by arranging adjacent swabs so that their stick sections lie parallel to a length of the fin. Furthermore, the fin has a length no longer than the stick section of any swab thereby allowing the cotton tips to occupy an area along each of the ends of the length of the fin.

Figure 1:
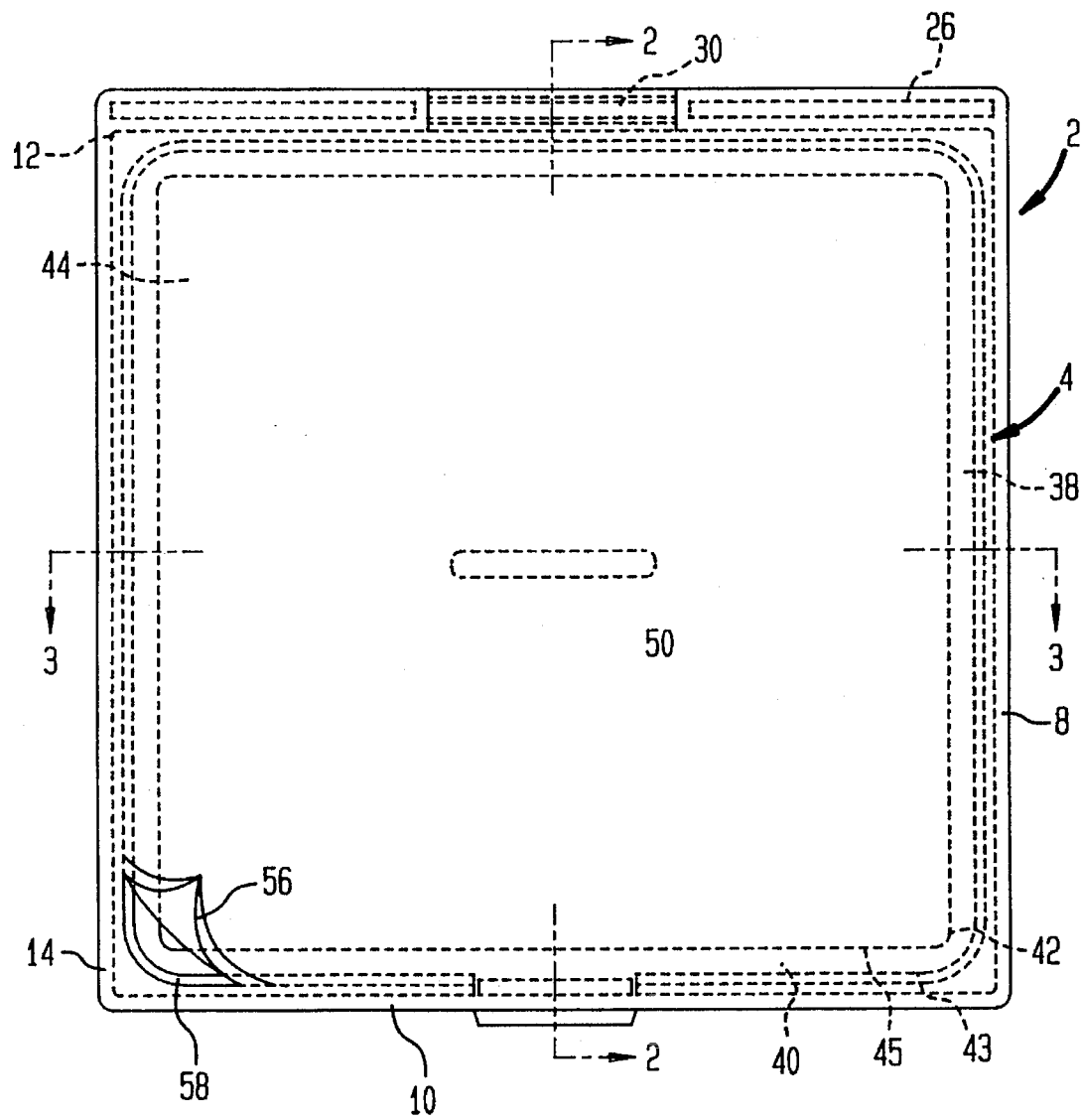
FIG. 1 is a top plan view of the dispenser with the lid of the receptacle rotated into an open position to reveal the refill container with its transparent top wall partially peeled away.
Figure 2:
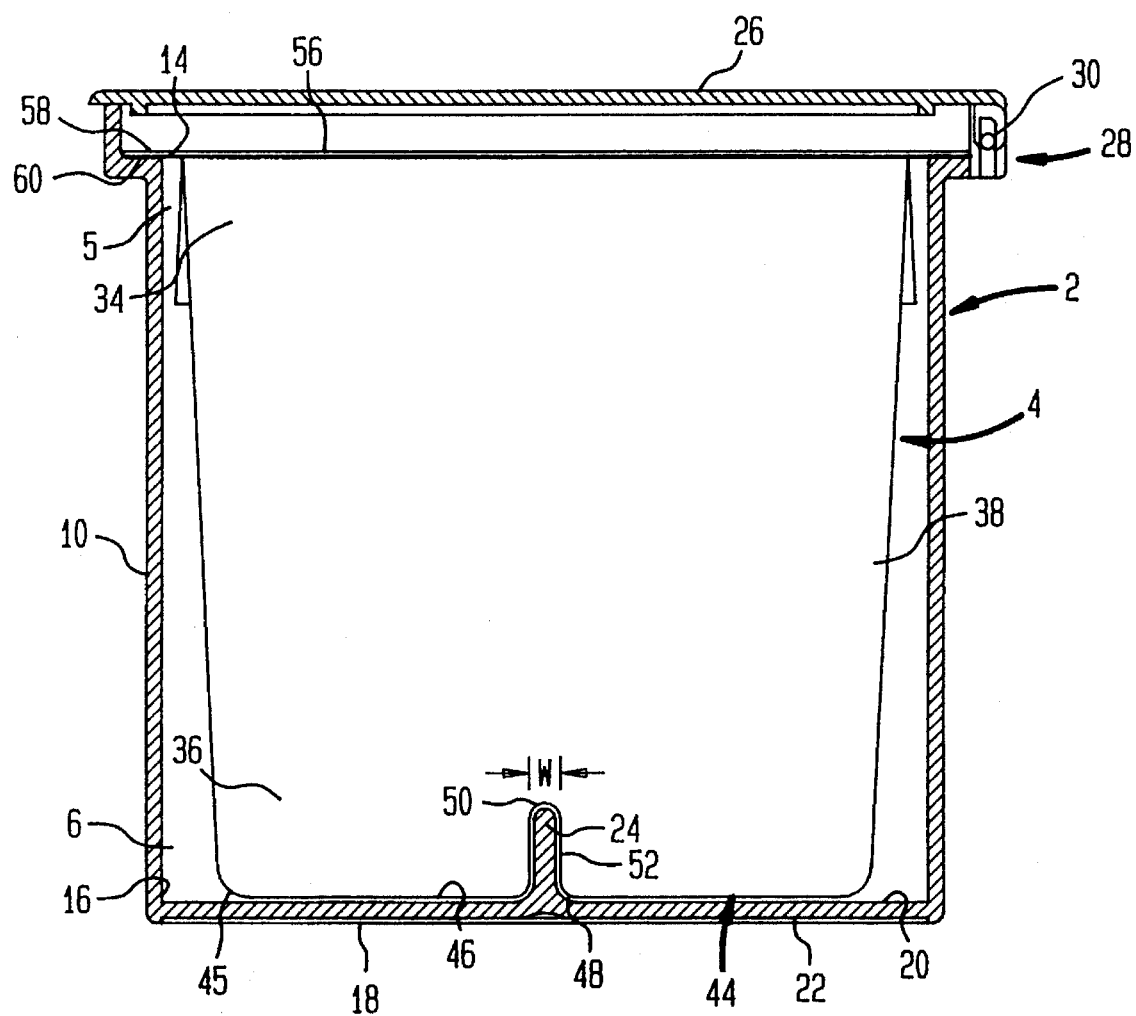
FIG. 2 is a cross-sectional view along line II—II of FIG. 1 to show a side view of the dispenser.
Figure 3:
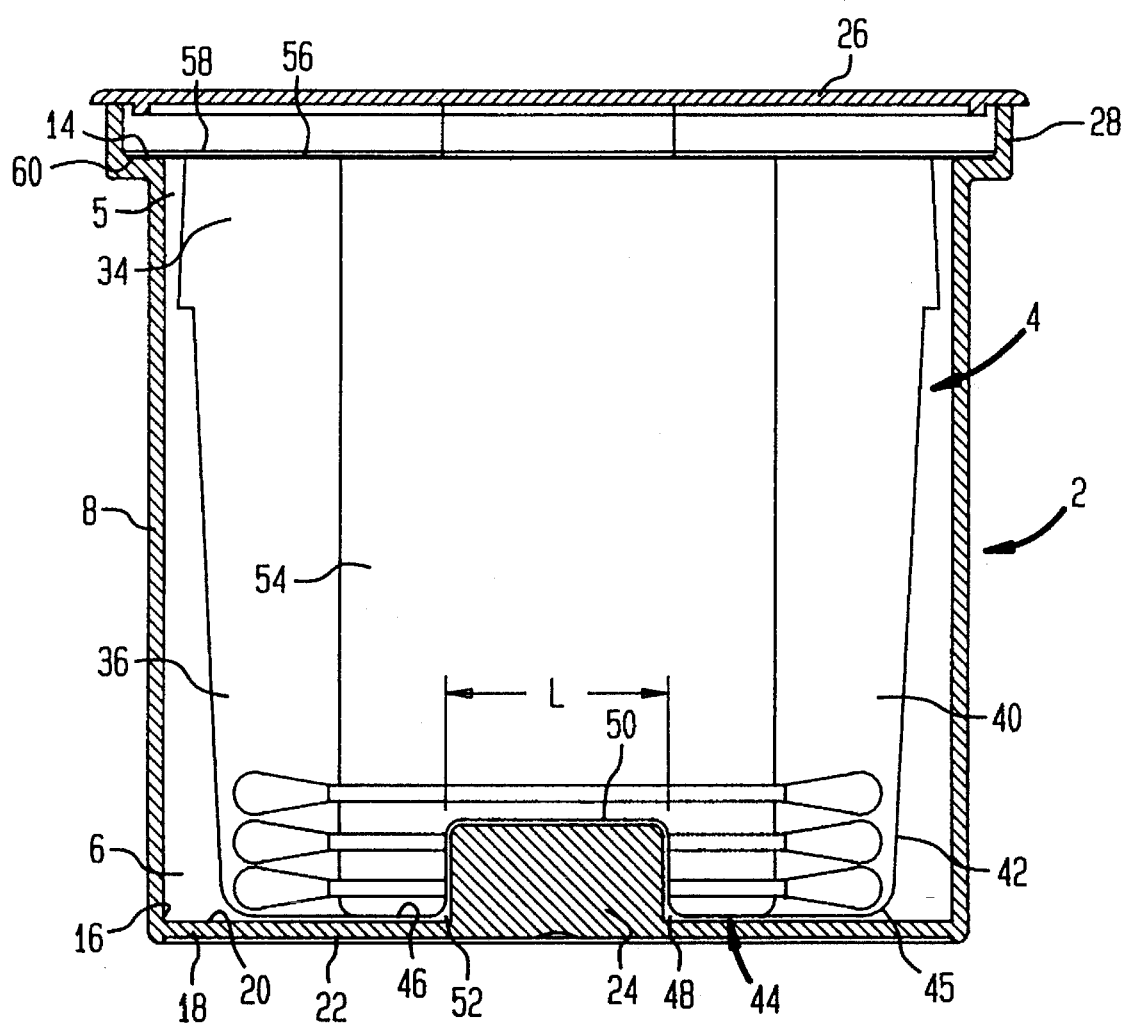
FIG. 3 is a cross-sectional view along line III—III of FIG. 1 to show a front view of the dispenser.

FIGS. 1 and 2 illustrate a dispenser according to the present invention including an outer receptacle 2 and a refill container 4. Outer receptacle 2 has an open end 5 and a closed end 6. The outer receptacle is formed from a pair of side panels 8 and a pair of front panels 10. These panels each have a pair of vertical edges 12, an upper horizontal edge 14 and a lower horizontal edge 16. Side and front panels 8, 10 are joined orthogonally along their respective vertical edges 12. A bottom panel 18 is orthogonally connected to each of the lower horizontal edges of the panels thereby defining the closed end of the receptacle. The receptacle bottom panel 18 has an inner and an outer surface 20, 22 on opposite faces.

Inner surface 20 includes a centrally positioned receptacle fin 24 having a horizontal length L greater than a width W thereof.

A lid 26 is attached in a movable manner to an upper area of receptacle 2. Dimensions of the lid are sufficient to cover the open end 5 thereof. As best shown in FIG. 2, the lid is pivotally connected to an upper area 28 of the receptacle by a hinge 30.

The replaceable refill container 4 is insertable within the outer receptacle 2. Container 4 has an open and a closed end 34, 36. The container is formed from a pair of side and front walls 38, 40. These walls each have a pair of vertical edges 42, an upper horizontal edge 43 and a lower horizontal edge 45. The side and front walls are orthogonally arranged such that their respective vertical edges connect to form the container. A bottom wall 44 is orthogonally connected to each of the lower horizontal edges 43 thereby defining the closed end 36 of the container.

The container bottom wall 44 has an inner and an outer surface 46, 48 including a centrally positioned fin 50 projecting vertically upwardly toward the container open end 34. On its outer surface 48, the fin has an aperture 52 for receiving the receptacle fin 24 in a mating arrangement.

Fin 50 of the refill container is wedge shaped with a width that tapers upwardly toward the open end of the container.

The refill container is best constructed as a thermoformed unitary plastic object. Most preferably the walls of the refill container are of a transparent plastic as an aid in monitoring the level of still available swabs. In the illustrated embodiment, refill container 4 has cubic dimensions, each of the side and front walls having identical dimensions of width and length.

Front walls 40 of the container are formed with an outwardly protruding section 54 to receive a product label therewithin. The protruding section has a length equivalent to that of the container front wall.

The refill container further includes a top wall 56 covering the open end 34 of the container. This top wall has an outer perimeter sealed to the container lip 58, the latter arranged all along the upper horizontal edges defining the open end of the refill container. Top wall 56 is removably peelable from the lip to allow access to an interior of the refill container.

The receptacle along an inner surface of the panels near the open end includes a shoulder 60. The refill container can be supported on shoulder 60 along a lower surface of lip 58.

The concept of the present invention is to have a relatively sturdy outer receptacle for multiple reuse. Refill containers will then be inserted within the outer receptacle, the latter being disposable after all swabs have been consumed. Thus, the receptacle panels will have a thickness greater than each of the refill container walls in line with their relative function. These panels will also be constructed of a material less deformable than the walls of the refill container.

It is to be understood that the invention in its broader aspects is not limited to the specific elements shown and described, but also includes within the scope of the accompanying claims any departures made from such elements which do not sacrifice its chief advantages.

What is claimed is:

1. A swab dispenser comprising:
   an outer receptacle with an open and a closed end, comprising:
      a pair of side panels parallel to one another;
      a pair of front panels, the side and front panels each defined by a pair of spaced apart parallel vertical edges and spaced apart upper and lower horizontal edges orthogonal to the vertical edges, the side panels being orthogonally connected to the front panels along the respective vertical edges;
      a bottom panel orthogonally connected to each of the lower horizontal edges defining the closed end of the receptacle, the bottom panel having an inner and an outer surface on opposite faces, the inner surface including a centrally positioned fin projecting vertically upwardly toward the receptacle open end, the fin having a horizontal length greater than a width thereof; and
      a lid attached in a movable manner to an upper area of the receptacle having dimensions sufficient to cover the open end thereof;
   a replaceable refill container insertable within the outer receptacle, the container having an open and a closed end, comprising:
      a pair of side walls parallel to one another;
      a pair of front walls, the side and front walls each defined by a pair of spaced apart parallel vertical edges and spaced apart upper and lower horizontal edges orthogonal to the vertical edges, the side walls being orthogonally connected to the front walls along the respective vertical edges;
      a lip formed all along the upper horizontal edge defining the open end of the container; and
      a bottom wall orthogonally connected to each of the lower horizontal edges defining the closed end of the container, the bottom wall having an inner and an outer surface on opposite faces, the inner surface of the container including a centrally positioned fin projecting vertically upwardly toward the container open end, and the container fin on its outer surface having an aperture therewithin for receiving the receptacle fin in a mating relationship.

2. The dispenser according to claim 1 wherein the fin of the refill container is wedge shaped with a width that tapers upwardly toward the open end of the container.

3. The dispenser according to claim 1 wherein the fin of the refill container occupies a volume no larger than is sufficient to store at most eight swabs.

4. The dispenser according to claim 1 wherein the refill container is constructed as a thermoformed plastic.

5. The dispenser according to claim 1 wherein the walls of the refill container are of a transparent plastic.

6. The dispenser according to claim 1 wherein the refill container has cubic dimensions, each of the side and front walls having identical dimensions of width and length.

7. The dispenser according to claim 1 wherein the front walls of the refill container are formed with an outwardly protruding section to receive a product label therewithin.

8. The dispenser according to claim 7 wherein the protruding section has a length equivalent to a full length of the container front wall.

9. The dispenser according to claim 1 wherein each of the receptacle panels has a thickness greater than that of each of the refill container walls.

10. The dispenser according to claim 1 wherein the panels of the receptacle are less deformable than the walls of the refill container.

11. The dispenser according to claim 1 wherein the refill container further comprises a top wall covering the open end of the refill container, the top wall having an outer perimeter releasably sealable to the container lip and thereby permitting the top wall to be removably peelable therefrom allowing access to an interior of the refill container.

12. The dispenser according to claim 1 wherein the receptacle along inner surfaces of the panels near the open end includes a shoulder for supporting the refill container along a lower surface of the lip.

13. The dispenser according to claim 1 wherein the lid is pivotally connected to an upper horizontal edge of the receptacle.

14. A refill container for packaging swabs having an open and a closed end, comprising:
   a pair of side walls parallel to one another;
   a pair of front walls, the side and front walls each defined by a pair of spaced apart parallel vertical edges and spaced upper and lower horizontal edges orthogonal to the vertical edges, the side walls being orthogonally connected to the front walls along the respective vertical edges, and the front walls being formed with an outwardly protruding section to receive a product label therewithin;
   a lip formed all along the upper horizontal edge defining the open end of the container; and
   a bottom wall orthogonally connected to each of the lower horizontal edges defining the closed end of the container, the bottom wall having an inner and an outer surface on opposite faces, the inner surface of the container including a centrally positioned fin projecting vertically upwardly toward the container open end, and the container fin on its outer surface having an aperture therewithin.

15. The container according to claim 14 wherein the fin is wedge shaped with a width that tapers upwardly toward the open end of the container.

16. The container according to claim 14 wherein the fin occupies a volume no larger than is sufficient to store at most eight swabs.

17. The container according to claim 14 which is constructed as a thermoformed plastic.

18. The container according to claim 14 wherein the walls are of a transparent plastic.

19. The container according to claim 14 wherein each of the side and front walls have identical dimensions of width and length.

20. The container according to claim 14 wherein the protruding section has a length equivalent to a full length of the container front wall.

21. The container according to claim 14 further comprising a top wall covering the open end of the refill container, the top wall having an outer perimeter releasably sealable to the container lip and thereby permitting the top wall to be removably peelable therefrom allowing access to an interior of the refill container.

22. A refill container for packaging swabs having an open and a closed end, comprising:

a pair of side walls parallel to one another;

a pair of front walls, the side and front walls each defined by a pair of spaced apart parallel vertical edges and spaced upper and lower horizontal edges orthogonal to the vertical edges, the side walls being orthogonally connected to the front walls along the respective vertical edges;

a lip formed all along the upper horizontal edge defining the open end of the container;

a bottom wall orthogonally connected to each of the lower horizontal edges defining the closed end of the container, the bottom wall having an inner and an outer surface on opposite faces, the inner surface of the container including a centrally positioned fin projecting vertically upwardly toward the container open end, and the container fin on its outer surface having an aperture therewithin; and a plurality of cotton-tipped swabs stored within an interior of the container.

* * * * *